C. A. CASE.
PROCESS FOR REDUCING AND DESULFURIZING REFRACTORY ORES.
APPLICATION FILED OCT. 11, 1909.
982,245.
Patented Jan. 24, 1911.
2 SHEETS—SHEET 1.
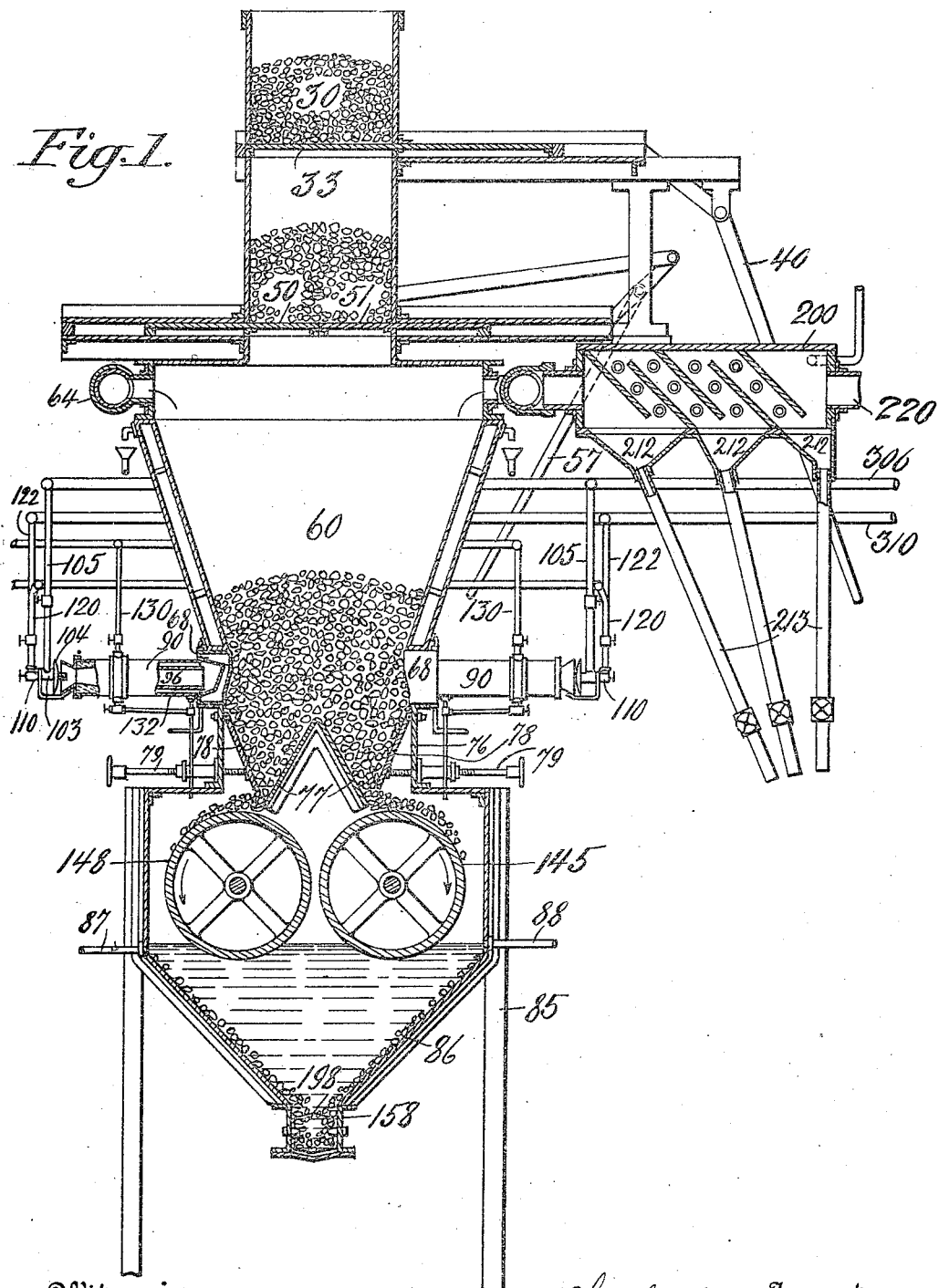

C. A. CASE.
PROCESS FOR REDUCING AND DESULFURIZING REFRACTORY ORES.
APPLICATION FILED OCT. 11, 1909.
982,245.
Patented Jan. 24, 1911.
2 SHEETS—SHEET 2.
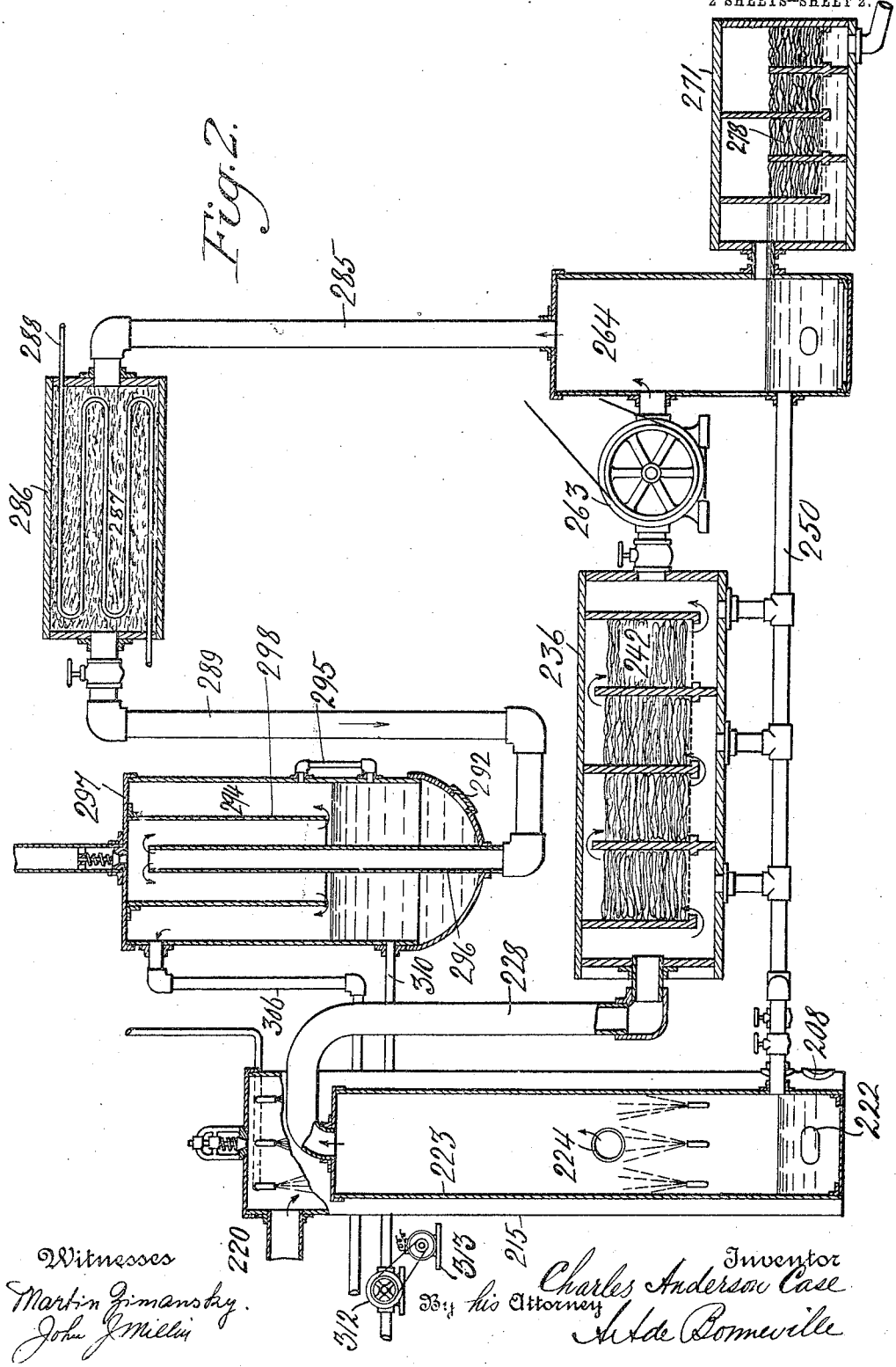

UNITED STATES PATENT OFFICE.

CHARLES ANDERSON CASE, OF NEW YORK, N. Y., ASSIGNOR, BY MESNE ASSIGNMENTS, TO ORE DESULPHURIZATION COMPANY, A CORPORATION OF NEW YORK.

PROCESS FOR REDUCING AND DESULFURIZING REFRACTORY ORES.

982,245.  Specification of Letters Patent.  Patented Jan. 24, 1911.

Application filed October 11, 1909. Serial No. 521,974.

*To all whom it may concern:*

Be it known that I, CHARLES ANDERSON CASE, a citizen of the United States, and a resident of the borough of Manhattan, in the county of New York and State of New York, have invented certain new and useful Improvements in Processes for Reducing and Desulfurizing Refractory Ores, of which the following is a specification.

This invention relates to the process for desulfurizing refractory ores and separating metals from the fumes generated in the process. The apparatus for carrying out the successive steps of this process is claimed in a pair of accompanying applications, namely an application for twyer, filed Oct. 11th, 1909, Serial No. 521,973, and an application for desulfurizing apparatus for refractory ores, filed Oct. 11th, 1909, Serial No. 521,972.

With this invention, refractory ores are heated and cooled for their partial disintegration, and desulfurized with superheated steam, air and oil. The fumes generated are treated in successive steps to precipitate or separate the metals contained therein. The fumes make consecutive cycles of operations, by which any combustible matter therein is used in enhancing the steps of the process, and insures the complete separation of the metals from the fumes.

The metals which are carried off with the fumes are those which exist in the ore as minerals, which are volatile at the temperature at which the furnace is operated (between 600° to 900° C.) These minerals in the case of gold and silver are the tellurids and selenids especially. Some of the more commonly occurring of these are white tellurium, petzite, sylvanite, nagyagite and hessite. Other minerals from which silver is volatilized at a comparatively low temperature are freieslebenite, polybasite, stephanite, pyrargyrite and proustite. The temperature at which these minerals are volatilized depends upon the conditions under which the furnace is working, such as the quantity of air and steam and their rate of flow, etc.

In the accompanying two sheets of drawings, sectional elevations of apparatus with portions thereof in full lines, are shown to carry out the steps of the process.

Figure 1, shows a furnace with its twyers, cooling hopper, baffle box and their appurtenances, and Fig. 2, shows spray tanks, zinc boxes, an exhauster, a sump tank, an oil tank and their appurtenances.

An ore charging hopper is represented at 30, having the upper sliding gate 33 controlled by the operating lever 40, and the lower sliding gates 50 and 51 controlled by the lever 57. The hopper 30 leads to the head of the water jacketed inclosed furnace 60. Fume piping 64 encircles the head of the furnace and is connected with the interior thereof. Water jacketed twyer supports 68 are connected with the furnace and support the twyers to be described. They prevent the overheating of the walls of the furnace by the said twyers.

The lower end of the furnace is supported on a frame 76 which has connected up therewith the inclined stationary and discharging chutes 77, and the adjustable chutes 78 which latter are inclined to different positions by means of the screw rods 79. Framing 85 supports a cooling hopper 86 having the inlet piping 87, and outlet piping 88 located below the furnace. The chutes 77 and 78 lead charges of gangue and metal into the said cooling hopper.

In the twyer supports 68 are located the twyers each with the outer barrel 90 and the combustion chamber 96, the said elements forming the annular superheating chamber 132 between them. A fuel chamber 103 extends into each twyer and is threaded on its outer surface for an adjustable damper 104, which latter controls the volume of air drawn into the twyer to support combustion therein. Fuel gas inlet piping 105 is connected to each fuel chamber 103 to furnish fuel gas for each twyer from the oil tank to be described. A burner 110 has connected thereto the steam piping 120, and the oil piping 122 connecting with said oil tank, the steam being used to vaporize the oil to start the operations of the twyers, and to combine with the fuel gas from said oil tank to feed the twyers and assist in desulfurizing the ore in the furnace. Steam piping 130 leads steam to the superheating chamber of each twyer, to be superheated by the heat given out from the combustion chamber 96, before mixing with the latter in the twyer supports 68. A pair of rotating discharging drums 145 and 148 are journaled within the cooling hopper 86 and have means connected thereto not shown to rotate them, preferably in opposite directions. An inclosed conveyer runway 158 connects with an opening in the lower end of the cooling tank 86, and contains a conveyer 198 to convey desulfurized ore and metals from the said cooling tank 86. A water jacketed baffle box 200 connects with the fume piping 64 to separate dust from the fumes and is itself connected with the spray tank 215 by means of the piping 220. The latter is connected with a second spray tank 223 by means of piping 224. Fume piping 228 extends from the upper end of the spray tank 223 and connects with the zinc box 236, preferably made of wood, and containing the zinc shavings 242. Drain piping 250 connects with the lower portions of the said spray tanks and the bottom of said zinc box. An exhauster 263 connects with the zinc box to draw fumes from the furnace 60 and through the fume piping 64, baffle box 200, the spray tanks 215, 223 and fume piping 228. A sump tank 264 is connected with the discharge end of the exhauster 263, and the drain piping 250 leads into the lower portion of said sump tank. A zinc box 271 similar to 236, having zinc shavings 278 connects with the lower portion of the sump tank 264 and constitutes an overflow therefor. Fume piping 285 extends from the top of the said sump tank to lead fumes to the box 286, preferably of wood, and containing iron shavings 287. A steam coil 288 within said box is used as a dryer. Fume piping 289 leads from the box 286 and connects with the bottom of the oil tank 294. A pipe 296 connected with the piping 289 extends into said tank 294, to within a short distance of the upper end thereof. The tank has a gage glass 295 and a hand hole at its lower end with hand hole plate 292. A bonnet 297 of the tank has fastened thereto a barrel 298, that extends to about the middle portion thereof and incloses the upper portion of the pipe 296. From the upper portion of the tank 294 extends the fuel gas piping 306 which connects with the piping 105 of the twyers. Oil piping 310 extends from the lower portion of the oil tank 294, and has connected thereto the pump 312 driven by the motor 313. The piping 310 connects with the oil piping 122 of each of the burners 110 of the twyers.

The mechanical operations and successive steps of the process comprise, charging ores, preferably refractory, into the charging hopper 30, and by means of the charging gates the ore descends into the central portion of the furnace 60 and piles up from the chutes 77 and 78 above the level of the twyers. Next the exhauster 263 is started and then oily waste to be ignited is placed within the twyers, and the operations of each twyer being the same the description will be confined to one. Oil is admitted into the twyer by means of the oil piping 122 and steam by means of the piping 120. The motor 313 rotating draws the oil from the tank 294 through and into the piping 310 and 122 discharging the same into the twyer. The oil is vaporized by the steam, ignited in the twyer, and is consumed in the combustion chamber 96. While the vaporized oil is burning in the said combustion chamber, steam is admitted to the annular superheating chamber 132 by means of the piping 130, and the heat of combustion superheats said steam. When the charges enter the twyer supports 68, they mix with said superheated steam. While the charge of steam and vaporized oil is entering the twyer, air is drawn therein, and the column thereof is regulated by the damper 104. The desulfurization of the ore is brought about by the action of the superheated steam and air; the endothermic reaction of the steam preventing the fusing of the ore, and the volatile compounds rise as fumes in the furnace. The heat given to the ores in the furnace partially disintegrates them.

While the furnace is being charged with ores the discharging drums 145 and 148 are rotated in opposite directions to each other. When the ore drops into the cooling hopper 86 it is again disintegrated, and any free metal in the ore passes with it into said hopper and can be easily separated from the gangue. The gangue with said free metal is carried away by means of the conveyer 198. The fumes are drawn up in the furnace 60 by virtue of the action of the exhauster 263 and the intervening appurtenances. After the twyers have been started by means of the steam from the piping 120 and the oil from the piping 122, and after a portion of the ore has been desulfurized, both may be shut off, depending upon the nature of the ore, and the twyers operated by means of fuel gas generated in the oil tank 294, and from the combustible gases generated in the furnace after they have made a cycle of their operations and have returned to the furnace. While the furnace is in operation the discharging drums 145 and 148 are rotated at a speed necessary to discharge the ore at a proper rate for treatment, securing an automatic discharging furnace. After the fumes leave the furnace they first enter the fume piping 64 and from thence are drawn into the baffle box 200, where the dust is separated therefrom. The dust enters the baffle outlets 212 and escapes by way of the pipes 213. The fumes are somewhat cooled in said baffle box and next enter the spray tank 215 where they are mixed with sprays of water. The water chills the fumes and collects a part which settles on the bottom of the tank; the remainder of the fumes with the gases next enters the second spray tank 223 where a further portion of the fumes is collected in the same manner.

The collected fumes in the form of a sludge are removed from the spray tanks through the openings having the hand hole plates 208 and 222. The uncollected fumes and gases leave the spray tank 223 through the fume piping 228 and enter the zinc box 236. The zinc shavings 242 in the box cause a further separation of the metals from the fumes and they are deposited thereon. After the completion of the treatment of the charge in the furnace the zinc shavings with their deposited metals are removed and separated, after which fresh zinc shavings are placed into the zinc box. The water carried over with the fumes is drawn off by the piping 250 which latter also drains the spray tanks. The remaining fumes and gases are next drawn into the exhauster 263 and from thence discharge into the sump tank 264, the piping 250 leading the water drained from the spray tank 215, 223 and the zinc box 236 into the lower portion of said sump tank. The water carried with the fumes and the gases is separated in the sump tank by gravitation, and in order to collect any metals either in suspension as condensed fumes or in solution the water collected in said sump tank is led to the zinc box 271 where the metal and the condensed fumes are collected and deposited on the zinc shavings 278 from which the metals are afterwards recovered by the usual methods. The remaining uncollected fumes and gases in the sump tank rise in the piping 285 and enter the box 286 with the iron shavings 287, in which a further recovery of the metals in the fumes is obtained by their precipitation on the iron shavings. The steam piping 288 in the box 286 dries the fumes. The remaining fumes and gases next enter the oil tank 294 through the piping 289 and the pipe 296, rising in the latter. After the fumes leave the pipe 296 they descend into the barrel 298 and come in contact with the oil in said tank 294 and vaporize some thereof. The vaporized oil is used as fuel gas for the twyers. Metals carried along with the fumes into the oil tank are filtered by the oil therein and deposited on the bottom of said tank from which they are removed, through the opening having the hand hole plate 292. The gases and vaporized oil leave the oil tank 294 by way of the piping 306, after which they enter the fuel gas inlet piping 105. The latter leads them into the fuel chamber 103 and from which they enter the twyers.

The reactions which occur in the furnace with the superheated steam and oil when there is ample air supply for conducting roasting, may be represented as follows:

$$C_{10}H_{22} + 10(H_2O) + X(O) = 21(H_2O) + 10(CO_2) + X - 31(O).$$

If the steam supply is cut off, then the oil is consumed with the production of very high temperature according to the equation.

$$C_{10}H_{22} + 31(O) = 11(H_2O) + 10(CO_2).$$

The effect of the superheated steam is the prevention of very high temperature as the result of its endothermic reaction, that is the absorption of heat in order to bring about reaction. The superheated steam also reacts with the sulfids of the ore, removing sulfur according to the equation, $$3FeS_2 + 5(H_2O) = 5H_2S + 3(FeO) + SO_2.$$

The above reaction occurs when no air is present; but when air is present, as in the case when roasting an ore in the furnace the reaction is $$3FeS_2 + 5(H_2O) + 15(O) = 3FeO + 5(H_2O) + 6SO_2.$$

The metals which collect in the baffle box, spray chambers and in the zinc boxes are the metals which are volatilized, the heavier particles tending to collect in the baffle box, the less heavier being carried along and a part collected in the spray chambers, and what is not collected is caught in the zinc boxes. The metallic zinc not only collects the metal particles by filtration but also by chemical precipitation. The latter is the result of some of the volatile minerals being soluble in dilute $H_2SO_4$ and $H_2SO_3$ which is formed by $SO_2$ and $SO_3$, taken into solution in the spray chamber. When these solutions are passed through the zinc boxes, what metal is in solution is precipitated according to the equations, in which M designates metals $$MSO_4 + Zn = M + ZnSO_4$$
$$MSO_3 + Zn = M + ZnSO_3.$$

A general equation for the reactions on sulfid ores in the furnace when acted upon by the superheated steam and no air may be represented by the following $$3(MS) + 3(H_2O) = 3MO + 3H_2S$$

and when both superheated steam and air act on the sulfid ores in the furnace the following equation represents the reaction $$3(MS) + 3(H_2O) + 6(O) = 3(MO) + 3(H_2O) + 3(SO_2).$$

The reaction of the iron shavings on the fumes may be represented by the equations $$MSO_4 + Fe = M + FeSO_4$$
$$MSO_3 + Fe = M + FeSO_3$$

in which M designates the metal in combination with $SO_4$ and $SO_3$.

Having described my invention what I desire to secure by Letters Patent and claim is:

1. The herein described process for desulfurizing ores containing volatile minerals consisting in heating them to partially disintegrate the same, subjecting them to superheated steam and oil for their desulfurization and separating metals from the fumes generated.

2. The herein described process for desulfurizing ores containing volatile minerals consisting in heating the ores to partially disintegrate them, subjecting them to superheated steam, oil and air for their desulfurization, separating metals from the fumes generated, and disintegrating the gangue produced.

3. The herein described process for desulfurizing ores containing volatile minerals consisting in heating them for the partial disintegration thereof, subjecting them to superheated steam, oil and air for desulfurization and dissolving the fumes generated in water, resulting from the generation of sulfurous and sulfuric acids when heating the ores.

4. The herein described process for desulfurizing ores consisting in heating them for the partial disintegration thereof, and thereby liberating sulfurous and sulfuric acids, subjecting the ores to superheated steam, air and oil to desulfurize them, treating the fumes generated with water thereby forming $H_2SO_3$ and $H_2SO_4$ and dissolving the minerals in the solution, subjecting the solution to zinc to precipitate the metals carried over in the fumes and forming zinc sulfite and zinc sulfates.

5. The herein described process for desulfurizing ores containing volatile minerals consisting in heating them for the partial disintegration thereof, and liberating $SO_2$ and $SO_3$, subjecting the ores to steam, oil and air to desulfurize them, treating the fumes generated with water, thereby forming $H_2SO_3$ and $H_2SO_4$ and dissolving the soluble metals contained in the fumes in said solution, treating the solution with metallic zinc to precipitate the metals thereof and then treating the fumes with iron to further precipitate remaining metals from the fumes.

6. The herein described process for desulfurizing ores containing volatile minerals consisting in heating them for the partial disintegration thereof, subjecting the ores to steam, air and oil to desulfurize them, treating the fumes generated with water to separate metals contained in them, subjecting the fumes to zinc for the further separation of the metals, then treating the fumes with iron to again separate metals therefrom, and treating the fumes with oil to filter remaining metals therefrom, forcing the fumes through an oil tank to mechanically filter any metals carried therein.

7. The herein described process for desulfurizing ores containing volatile minerals consisting in heating them for the partial disintegration thereof, treating the ores with steam and air to desulfurize them, treating the fumes generated with water to separate the metals contained in the fumes, subjecting the fumes to zinc for the further separation of metals in the fumes, treating the fumes with iron to again separate metals therefrom, and subjecting the fumes to oil to filter the remaining metals therefrom and to generate fuel gas for the reduction of the ores.

8. The herein described process for oxidizing and desulfurizing ore containing volatile minerals consisting in superheating steam, and mixing it with vaporized oil and subjecting the ore to the mixture to desulfurize the same, treating the fumes generated with water to separate metals therefrom, then treating the fumes with zinc shavings to further separate the metals therefrom, next subjecting the fumes to iron shavings to again separate metals and bringing the fumes in contact with oil to filter remaining metals therefrom and to vaporize the oil to produce fuel gas for the reduction of ores, and disintegrating the gangue of the ores with water.

Signed at the borough of Manhattan in the county of New York and State of New York this 9th day of October A. D. 1909.

CHARLES ANDERSON-CASE.

Witnesses:
A. A. DE BONNEVILLE,
MARTIN ZIMANSKY.